(12) United States Patent
Choi

(10) Patent No.: US 7,505,579 B2
(45) Date of Patent: Mar. 17, 2009

(54) SHORTENED DIALING DEVICE AND PHONE COMBINED A FRAME

(76) Inventor: Byung-Deuk Choi, 301-1, Bokhyun-dong, Buk-gu, Taegu 702-020 (KR)

( * ) Notice: Subject to any disclaimer, the term of this patent is extended or adjusted under 35 U.S.C. 154(b) by 613 days.

(21) Appl. No.: 10/476,406

(22) PCT Filed: May 7, 2002

(86) PCT No.: PCT/KR02/00848

§ 371 (c)(1),
(2), (4) Date: May 11, 2004

(87) PCT Pub. No.: WO02/091716

PCT Pub. Date: Nov. 14, 2002

(65) Prior Publication Data

US 2004/0184596 A1      Sep. 23, 2004

(30) Foreign Application Priority Data

May 7, 2001      (KR) ............................... 2001-13110

(51) Int. Cl.
*H04M 1/00* (2006.01)
*H04M 3/00* (2006.01)

(52) U.S. Cl. ............................................... 379/355.01
(58) Field of Classification Search ........... 379/355.01, 379/433.04; 455/564
See application file for complete search history.

(56) References Cited

U.S. PATENT DOCUMENTS

| 2,325,095 | A | * | 7/1943 | Auth ............................ 174/57 |
| 5,398,279 | A | * | 3/1995 | Frain ........................... 379/140 |
| 5,752,195 | A | * | 5/1998 | Tsuji et al. ................... 455/462 |
| 6,611,673 | B1 | * | 8/2003 | Bayley et al. ............... 455/564 |
| 2004/0037420 | A1 | * | 2/2004 | Brieskorn ................... 379/419 |

* cited by examiner

*Primary Examiner*—Alexander Jamal
(74) *Attorney, Agent, or Firm*—Bell, Boyd & Lloyd LLP

(57) ABSTRACT

Disclosed present invention is a shortened dialing device and phone combined with a frame. More particularly, the present invention relates to the shortened dialing device and phone combined with a frame which can be used to make a phone call in such a manner that sensors for shortened dialing are attached to specific positions in a picture of a frame such that a calling party applies pressure to or touches his or her finger to one of the specific positions, a calling signal corresponding to a predefined telephone number is transmitted in a wired or wireless manner through a shortened dialing device or phone operative to the sensors.

15 Claims, 10 Drawing Sheets

SHORTENED DIALING DEVICE AND PHONE COMBINED A FRAME

TECHNICAL FIELD

The present invention relates to a shortened dialing device and phone combined with a frame, and more particularly, to a shortened dialing device and phone combined with a frame in which sensors for shortened dialing are attached to specific positions in a picture of a picture frame such that when applying pressure or touching to one of the specific positions, a calling signal corresponding to a predefined telephone number is sent out through a shortened dialing device or phone connected to the sensors, thereby speaking to a called party.

BACKGROUND ART

In general, a conventional shortened dialing is mostly made in such a manner as to input a telephone number corresponding to a rapid button on a telephone set or connect a separate external apparatus for storing the telephone number to the telephone.

The conventional shortened dialing method, however, has a drawback in that the space usable in the telephone is small and accordingly the font size of letters (names), digits (telephone numbers) or the like for recognizing the rapid button should be reduced. In consequence, children or the old have some difficulty in reading the letters, digits or the like. In other words, they find it difficult to know which rapid button is connected to where or whom.

In addition, the conventional method of connecting the separate external shortened dialing device is shown in many disclosures, such as Korean Utility Model Registration No. 92-206 entitled "a portable dialing device", Korean Utility Model Registration No. 91-2971 entitled "a wristwatch having an shortened dial tone generator for an electronic D.T.M.F (Dual Tone Multiple Frequency) telephone, Korean Utility Model Registration No. 2000-7143 entitled "an automatic dialing device of a telephone", and so on. However, the devices in the disclosures have a problem in that children or the old should press rapid buttons to which corresponding telephone numbers are assigned, and they feel it difficult to recognize which rapid button is connected to where or whom.

DISCLOSURE OF INVENTION

Accordingly, the present invention is directed to a shortened dialing device and phone combined with a frame that substantially obviate one or more problems due to limitations and disadvantages of the related prior art.

An object of the present invention is to provide a shortened dialing device and phone combined with a frame in which sensors for shortened dialing are attached to specific positions in a picture of a frame such that when a calling party applies pressure to or touches to one of the specific positions, a calling signal corresponding to a predefined telephone number is sent out through a shortened dialing device or phone connected to the sensors, thereby speaking to a called party.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims, hereof as well as the appended drawings.

To achieve these objects and other advantages and in accordance with the purpose of the invention, as embodied and broadly described herein, there is provided a shortened dialing device combined with a frame comprising: a sensor block including a plurality of sensors attached to specific positions in a picture of a picture frame and adapted to function as shortened dialing buttons; a sensor detecting block for detecting signals inputted from the sensor block and converting the detected signals into digital signals; a keypad used for inputting shortened telephone numbers corresponding to the respective sensors of the sensor block and inputting data for setting functions; a dial signal transmitter for generating dial signals corresponding to the shortened telephone numbers and transmitting the generated dial signals through a telephone and a telephone line; a memory for storing data corresponding to the shortened telephone numbers and processing a data operation; a liquid crystal display unit for displaying both the shortened telephone numbers inputted through the keypad and the data stored in the memory; and a CPU (Central Processing Unit) for controlling the elements constituting the device.

Preferably, the shortened dialing device combined with a frame further includes: an audio signal inputting block for receiving audio signals corresponding to the shortened telephone numbers, converting the received audio signals into digital audio data, and outputting the digital audio data to the CPU; and an audio signal transmitting block connected to the CPU and adapted to convert the audio data into analogue signals and transmit the analogue signals through the telephone and the telephone line.

The shortened dialing device combined with a frame may further include a radio transceiver for wirelessly receiving/transmitting telephone number data corresponding to the shortened telephone numbers or audio data through RF (Radio Frequency) or IR (Infrared-Ray) communication from/to other shortened dialing devices combined with a frame under the control of the CPU.

Preferably, the shortened dialing device combined with a frame is wirelessly operative to a signal transmitter to transmit the shortened telephone numbers, the signal transmitter comprising: a radio transceiver for wirelessly receiving/transmitting telephone data corresponding to the shortened telephone numbers or audio data through RF or ER communication; a dial signal transmitter for generating dial signals corresponding to the telephone number data received through the radio transceiver and transmitting the generated dial signals through the telephone and the telephone line; an audio signal transmitting block for converting the audio data received through the radio transceiver into analogue signals and transmitting the analogue signals through the telephone and the telephone line; a CPU for analyzing data received through the radio transceiver and outputting control signals to the dial signal transmitter or the audio signal transmitting block; and a memory for operating and storing data with the CPU.

Preferably, the signal transmitter further includes a liquid crystal display unit for displaying the telephone numbers while data corresponding to the shortened telephone numbers are transmitted through the CPU.

The signal transmitter may be wirelessly operative to other shortened dialing devices combined with a frame.

Preferably, the radio transceiver is connected to the CPU such that when not used, it can be cut off supplying power through a power supply block which supplies a circuit with power.

Preferably, the shortened dialing device combined with a frame is operative to other shortened dialing devices combined with a frame in a wired or wireless manner. Preferably, the sensors are pressure sensors for sensing pressure, IR sensors for sensing heat, or various touch switches.

Preferably, the frame and the sensor block can be separated from other elements of the shortened dialing device.

To achieve the objects and other advantages and in accordance with the purpose of the invention, as embodied and broadly described herein, there is also provided a shortened dialing phone combined with a frame, the shortened dialing phone comprising: a sensor block including a plurality of sensors attached to specific positions in a picture of a frame and adapted to function as shortened dialing buttons; a sensor detecting block for detecting signals inputted from the sensor block and converting the detected signals into digital signals; a keypad used for inputting shortened telephone numbers corresponding to the respective sensors of the sensor block and inputting data. for setting functions; a dial signal transmitter for generating dial signals corresponding to the shortened telephone numbers and outputting the generated dial signals; a memory for storing data corresponding to the shortened telephone numbers and processing a data operation; a liquid crystal display unit for displaying both the shortened telephone numbers inputted through the keypad and the data stored in the memory; a CPU for controlling the elements constituting the phone; and a speaking circuit operative to a wired/wireless handset of the phone and adapted to transmit dial—signals of the dial signal transmitter via a telephone line under the control of the CPU. Preferably, the shortened dialing phone combined with a frame further includes: an audio signal inputting block for receiving audio signals corresponding to the shortened telephone numbers, converting the received audio signals into digital audio data, and outputting the digital audio data to the CPU; and an audio signal transmitting block connected to the CPU and adapted to convert the audio data into analogue signals and output the analogue signals.

The speaking circuit may transmit audio data of the audio signal transmitting block via the telephone line under the control of the CPU.

The shortened dialing phone may further include a radio transceiver for wirelessly receiving/transmitting telephone number data or the audio data corresponding to the shortened telephone numbers through RF or IR communication from/to other shortened dialing phones combined with a frame under the control of the CPU.

Preferably, the shortened dialing phone combined with a frame is operative to other shortened dialing phones combined with a frame in a wired or wireless manner.

Preferably, the sensors are pressure sensors for sensing pressure or IR sensors for sensing heat.

Preferably, the frame and the sensor block are separable from other elements of the shortened dialing phone.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

The present invention will now be described in detail in connection with preferred embodiments with reference to the accompanying drawings. For reference, like reference letters designate corresponding parts throughout several views.

Figure 1:
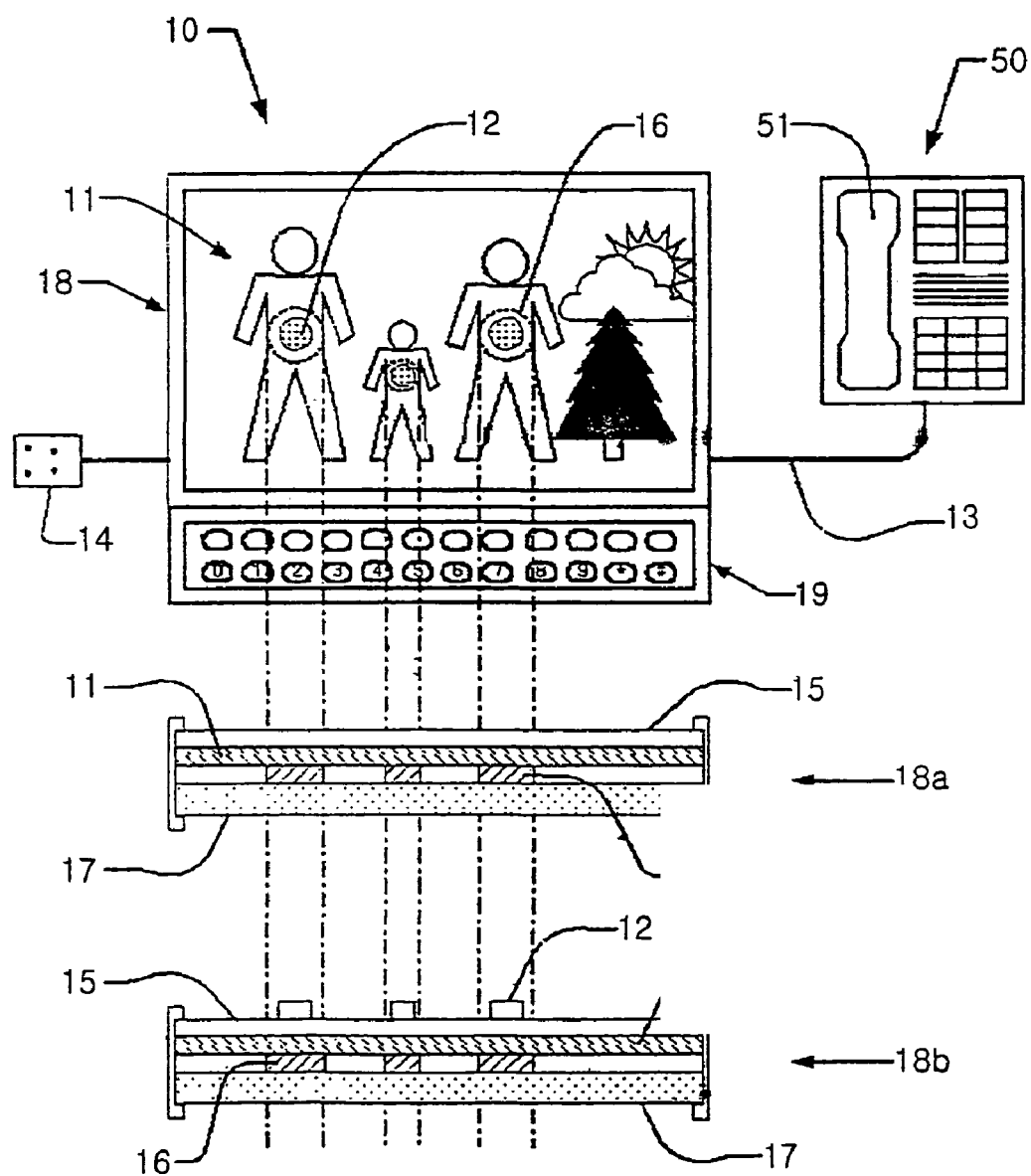
FIG. 1 is a diagrammatic view illustrating a shortened dialing device combined with a frame according to a first preferred embodiment of the present invention.

FIG. 1 is a diagrammatic view illustrating a shortened dialing device combined with a frame according to a first preferred embodiment of the present invention. Referring to FIG. 1, the shortened dialing device combined with a frame 10 according to the present invention includes a frame 18 containing a picture 11 therein, and a fixed plate 17 having a plurality of sensors 16 attached thereon is secured at the rear surface of the picture 11 such that the sensors 16 are attached to specific positions in the picture 11. Further, a keypad 19 is used for inputting shortened telephone numbers corresponding to the sensors 16, and performing a shortened dialing function. A general telephone 50 and a plug 14 are connected to the shortened dialing device combined with a frame 10 via a telephone line 13. Therefore, if a calling party hooks off a handset 51 of the telephone 50 and applies pressure to or makes contacts with one of the specific positions in the picture 11 of the frame 18a and 18b in order to operate one of the sensors attached to the specific positions, a pre-inputted and stored telephone number is transmitted, thereby making a phone call to a pertinent character in the picture 11.

The plurality of sensors 16 may be pressure sensors for sensing pressure, IR sensors for sensing heat, or various switches, e.g., press-type touch switches, which can recognize contact like general telephone buttons. The sensors 16, which are attached to the specific positions in the picture 11 of the frame 18a and 18b, are separable from and connectable to the shortened dialing device combined with a frame 10. That is to say, the sensors 16 can be attached to the rear surface of the frame 18a in which the picture 11 is contained. buttons 12 can be attached to the front surface of the frame 18b in which the picture 11 is contained so as to specify portions to be pressed, clarify operations of the sensors, and inform where are appointed for certain telephone numbers, respectively. Furthermore, if a called party has a plurality of telephone numbers, for example, telephone numbers for house, office, cellular phone, etc., a number of buttons 12 can be allotted to the called party. When such various buttons 12 as house-shaped buttons, office-shaped buttons, cellular phone-shaped buttons, speaker-shaped buttons for audio storage and transmittance are employed, a user can easily make a phone call since he/she can easily find whom and where to call in the picture upon seeing the shapes of the buttons 12 and transmit his/her stored voice, if necessary.

A transparent protection plate 15 may be attached to the front surface of the picture in order to prevent the picture from being damaged and facilitate attachment of the buttons 12. It is preferable that for safety, the protection plate 15 is made of resin materials which are non-fragile, thin, soft, and transparent.

Figure 2:
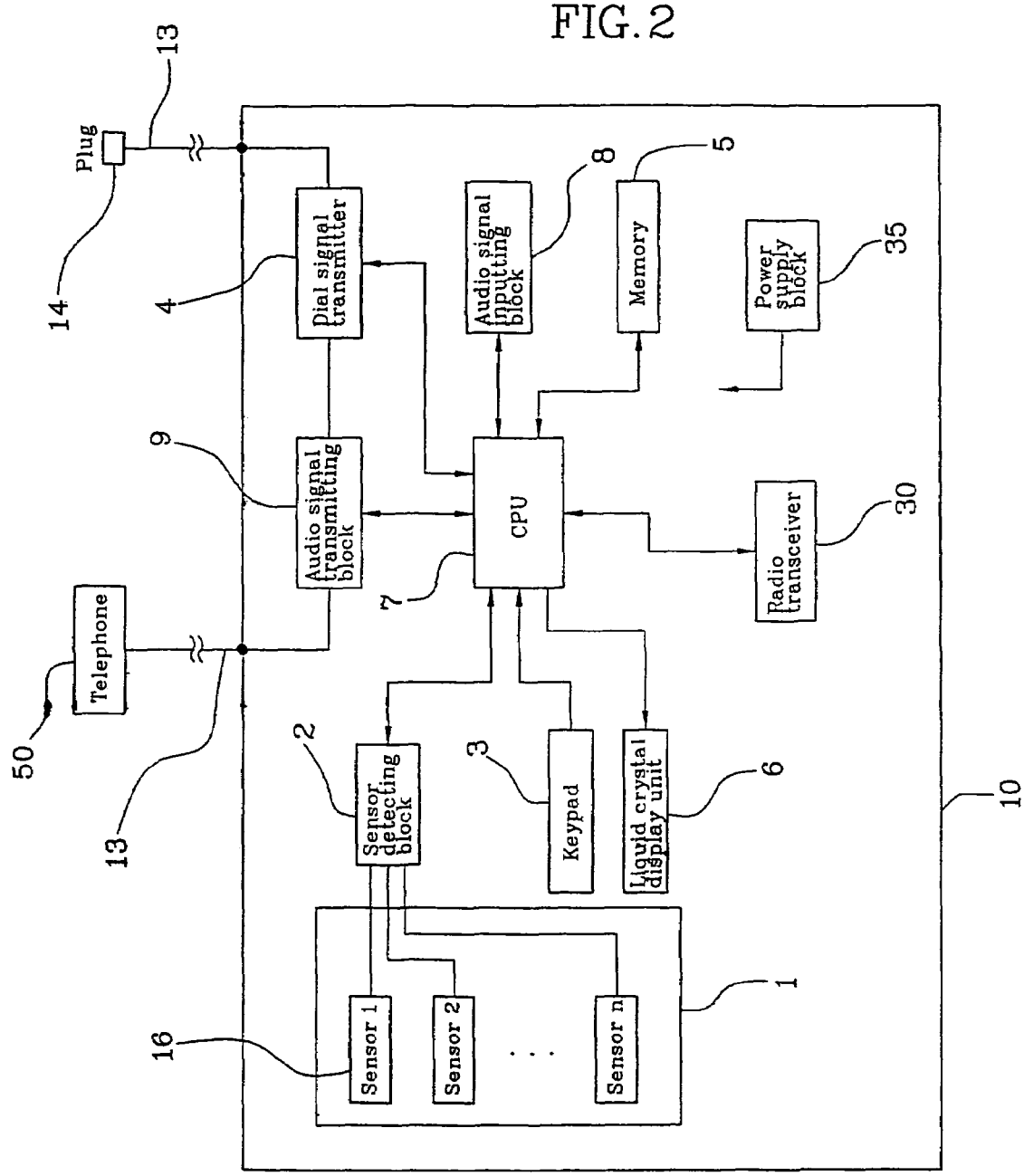
FIG. 2 is a block diagram illustrating the internal structure of the shortened dialing device combined with a frame of FIG. 1.

FIG. 2 is a block diagram illustrating the internal structure of the shortened dialing device combined with a frame 10 of FIG. 1. The shortened dialing device combined with a frame 10 according to the present invention comprises: a sensor block 1 including a plurality of sensors 16 attached to the specific positions in the picture 11 of the frame '18 and adapted to function as shortened dialing buttons; a sensor detecting block 2 for detecting signals inputted from the sensor block and converting the detected signals into digital signals; a keypad 3 used for inputting shortened telephone numbers assigned to the shortened dialing buttons corresponding to the respective sensors 16 of the sensor block 1 and inputting data for setting functions; a dial signal transmitter 4 for generating dial signals corresponding to the shortened telephone numbers and transmitting the generated dial signals through a plug 14 connected to the telephone line 13 and the telephone 50; a memory 5 for storing data corresponding to the shortened telephone numbers and processing a data operation; a liquid crystal display unit 6 for displaying both the shortened telephone numbers inputted through the keypad 3 and the data stored in the memory; and a CPU 7 for controlling the elements constituting the device.

The shortened dialing device combined with a frame 10 may further include: an audio signal inputting block 8 for receiving audio signals corresponding to the shortened telephone numbers, converting the received audio signals into digital signals, and transmitting the digital signals to the CPU 7; and an audio signal transmitting block 9 connected to the CPU 7 and adapted to convert the audio data into analogue signals and transmit the analogue signals through the telephone 50 via the telephone line 13.

The audio data can be stored in the memory 5 and then transmitted through the audio signal transmitting block 9 under the control of the CPU 7. Otherwise, they can be temporarily stored in the audio signal transmitting block 9 and then transmitted as well.

Figure 4A:
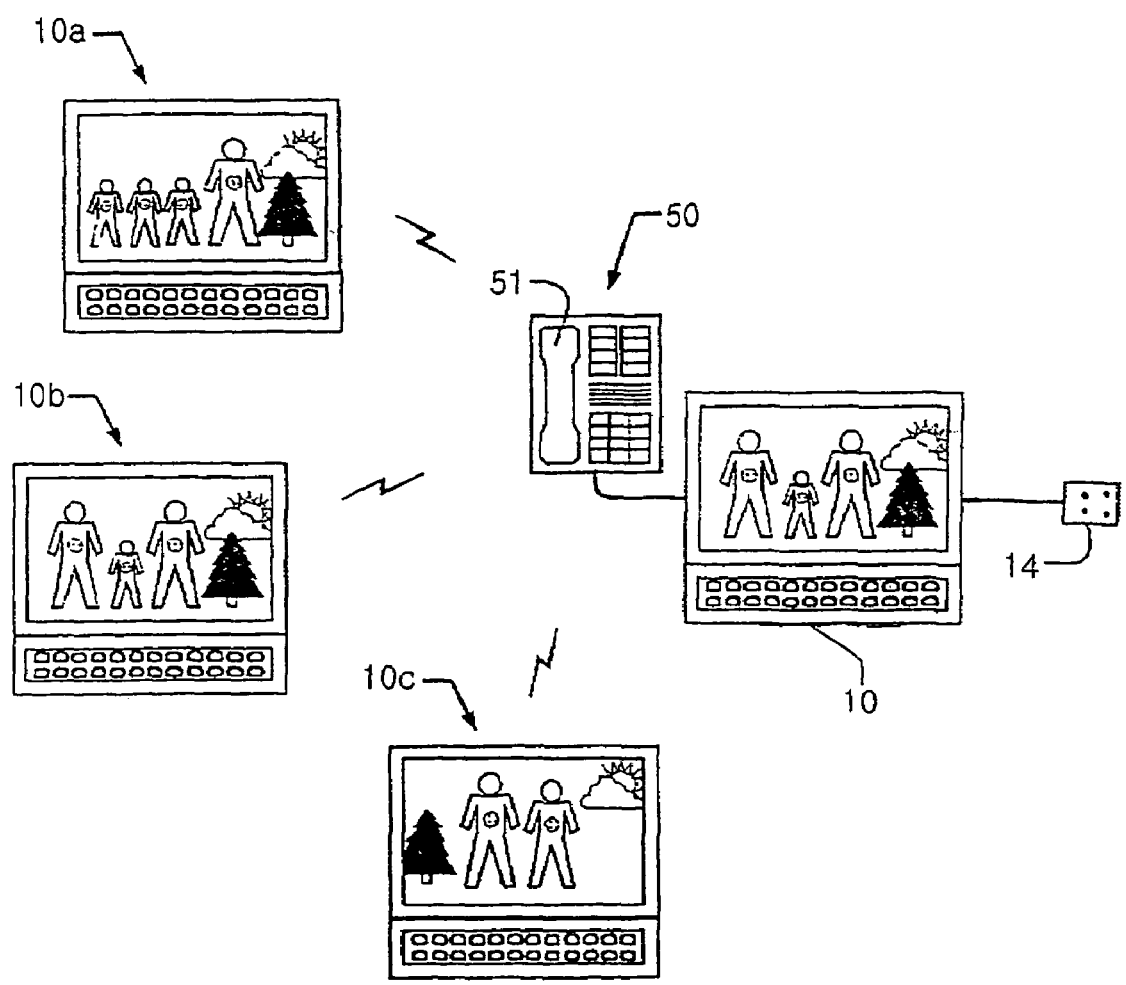
FIG. 4a is a diagrammatic view illustrating a state in which the shortened dialing device combined with a frame connected to the telephone is connected to other shortened dialing devices combined with a frame in a wireless manner according to the first preferred embodiment of the present invention.

The shortened dialing device combined with a frame 10 may also include a radio transceiver 30 for wirelessly receiving/transmitting telephone number data corresponding to the shortened telephone numbers or the audio data through RF or IR communication from/to other shortened dialing devices combined with a frame 10a to 10c under the control of the CPU 7 (see FIG. 4a).

The radio transceiver 30 is operative to the CPU 7 such that when not used, it is prevented from being supplied with power through a power supply block 35 which supplies a circuit with power or an on/off switch (not shown) so as to be stopped in function.

A mode of the shortened dialing device combined with a frame 10 can be set depending on the environment of the device used. By way of example, there can be selected one from a mode in which the shortened dialing device combined with a frame is independently used, a mode in which the shortened dialing devices combined with a frame are connected in a wired manner, a mode in which the shortened dialing devices combined with a frame are connected in a wireless manner, and a mode in which the combined picture frame and abbreviated dialing devices are connected in wired and wireless manners. The shortened dialing device combined with a frame can be operated in one of the various modes. Once the mode in which the device is independently used or the mode in which the devices are connected in a wired manner is selected, it is not carried out in a wireless manner and thus the radio transceiver 30 can be stopped in operation.

Figure 3:
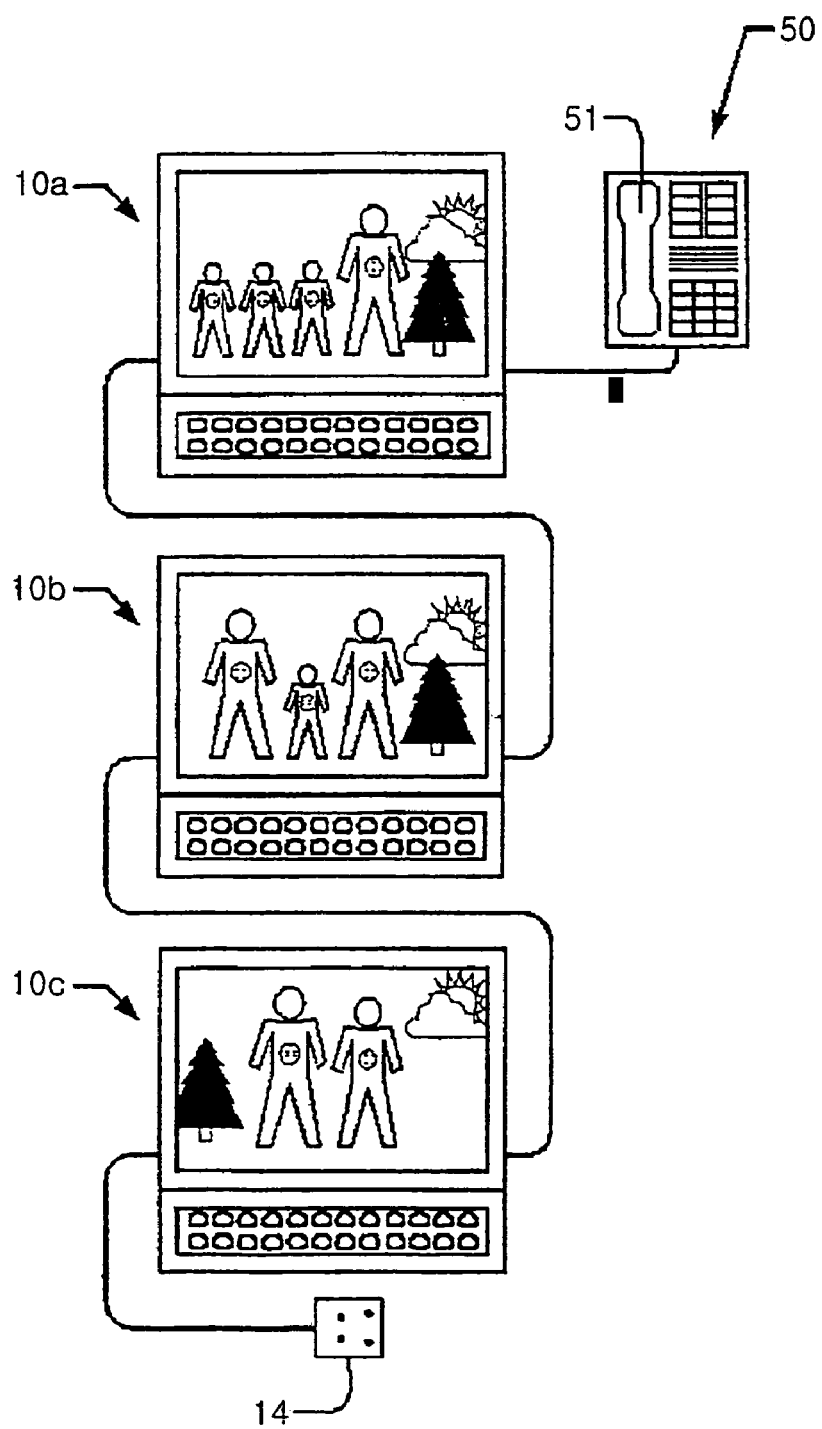
FIG. 3 is a diagrammatic view illustrating a state in which a plurality of shortened dialing devices combined with a frame are connected to one telephone in a wired manner according to the first preferred embodiment of the present invention.

The shortened dialing device combined with a frame 10 can be connected to other shortened dialing devices combined with a frame 10a to 10c in a wired or wireless manner, as shown in FIGS. 3 and 4a.

To be specific, FIG. 3 is a diagrammatic view illustrating a state in which the plurality of shortened dialing devices combined with a frame 10a to 10c are connected to one telephone 50 in a wired manner.

Referring to FIG. 3, the plurality of shortened dialing devices combined with a frame 10a to 10c are connected via the telephone line that connects the telephone 50 and the plug 14.

FIG. 4a is a diagrammatic view illustrating a state in which the shortened dialing device combined with a frame 10 connected to the telephone 50 is connected to the plurality of shortened dialing devices combined with a frame 10a to 10c in a wireless manner through the radio transceiver 30 according to the present invention.

Referring to FIG. 4a, when a calling party touches a specific position in the picture of the frame of one among the plurality of shortened dialing devices combined with a frame 10a to 10c, a telephone call can be made to a pre-inputted and stored telephone number.

Figure 4B:
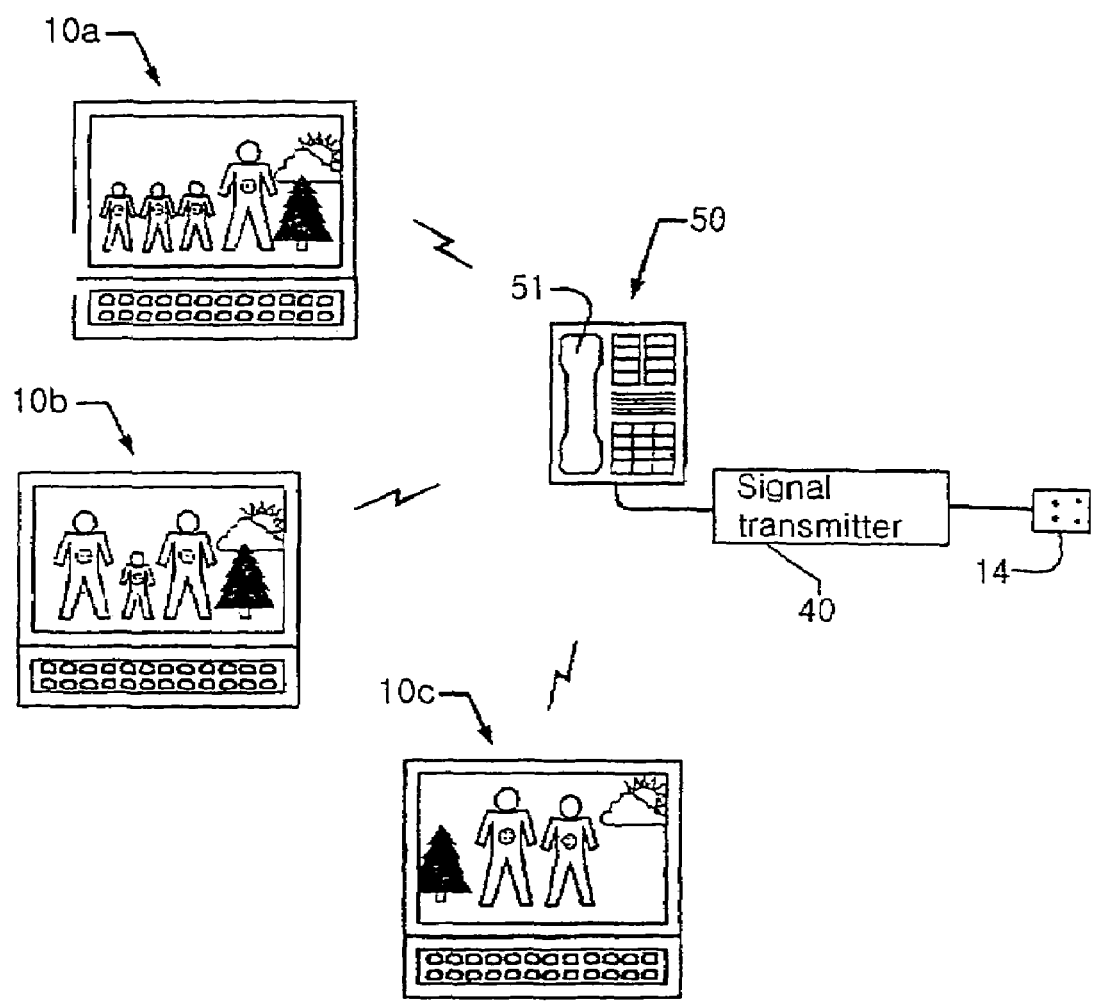
FIG. 4b is a diagrammatic view illustrating a state in which the shortened dialing devices combined with a frame are connected in a wireless manner through a signal transmitter connected to the telephone according to the first preferred embodiment of the present invention.

The plurality of shortened dialing devices combined with a frame lift to 10c of FIG. 4a may be connected through a separate signal transmitter 40 connected to the telephone 50 in a wireless manner, as shown in FIG. 4b.

Figure 5:
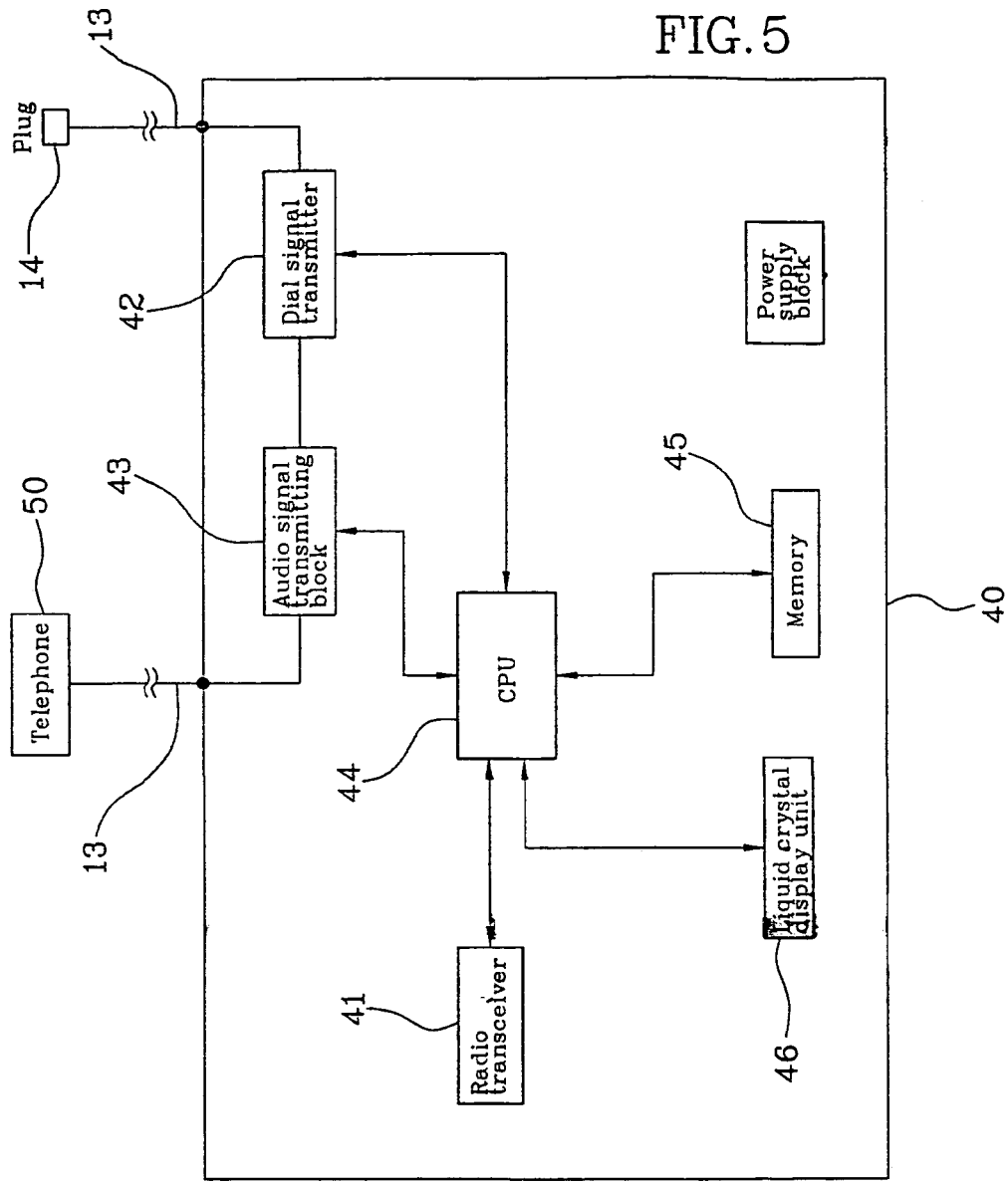
FIG. 5 is a block diagram illustrating the internal structure of the signal transmitter of FIG. 4b.

FIG. 5 is a block diagram illustrating the internal structure of the signal transmitter 40 of FIG. 4b.

Referring to FIG. 5, the signal transmitter 40 includes: a radio transceiver 41 for wirelessly receiving/transmitting telephone number data corresponding to the abbreviated telephone numbers or audio data through RF or IR communication from/to the plurality of shortened dialing devices combined with a frame 10a to 10c; a dial signal transmitter 42 for generating dial signals corresponding to the telephone number data received through the radio transceiver 41 and transmitting the generated dial signals through the telephone 50 and the telephone line 13; an audio signal transmitting block 43 for converting the audio data received through the radio transceiver 41 into analogue signals and transmitting the analogue signals through the telephone 50 and the telephone line 13; a CPU 44 for analyzing data received through the radio transceiver 41 and outputting control signals to the dial signal transmitter 42 or the audio signal transmitting block 43; and a memory 45 for calculating and storing data operative to the CPU 44.

The signal transmitter 40 may further include a crystal liquid display unit for displaying the telephone numbers while data corresponding to the shortened telephone numbers are transmitted under the control of the CPU 44.

The shortened dialing device combined with a frame 10 according to the present invention can be varied and modified by those of ordinary skill in the art.

FIGS. 6 to 9 illustrate a shortened dialing phone combined with a frame according to a second preferred embodiment of the present invention.

Figure 6:
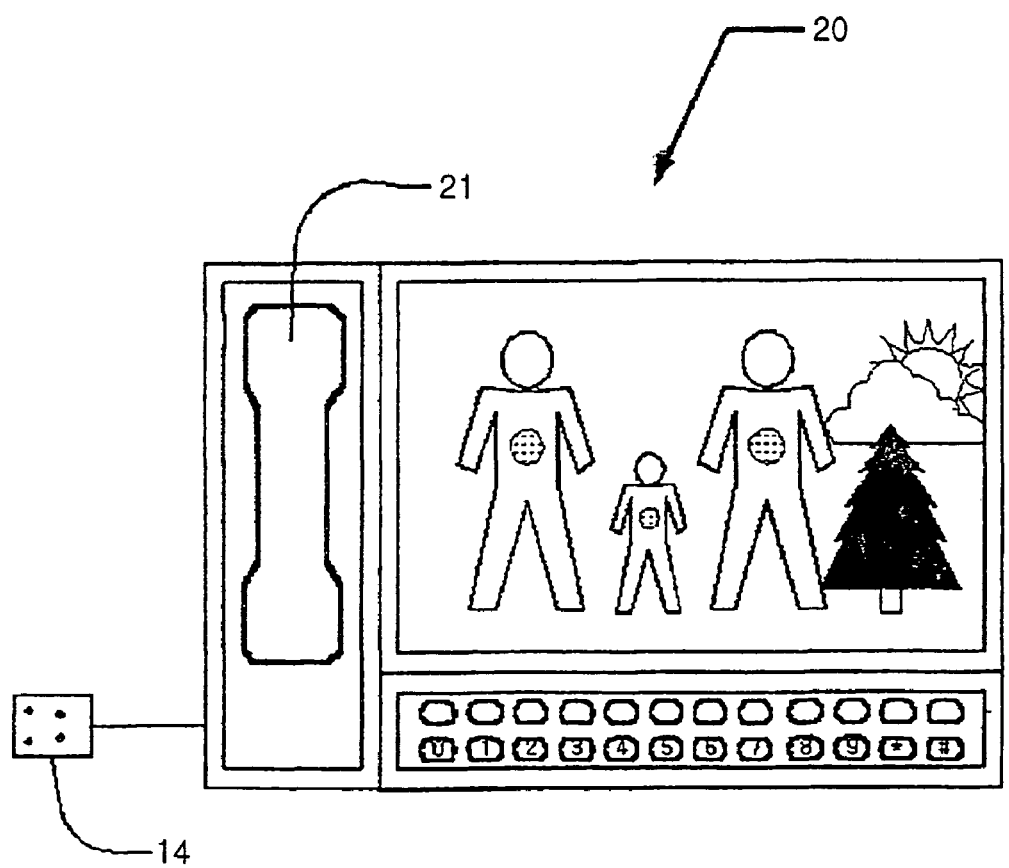
FIG. 6 is a diagrammatic view illustrating a shortened dialing phone combined with a frame according to a second preferred embodiment of the present invention.

As depicted in FIG. 6, the shortened dialing device combined with a frame 10 according to the first preferred embodiment of the present invention is integrally coupled with the common telephone, so that there can be formed a shortened dialing phone combined with a frame 20.

Figure 7:
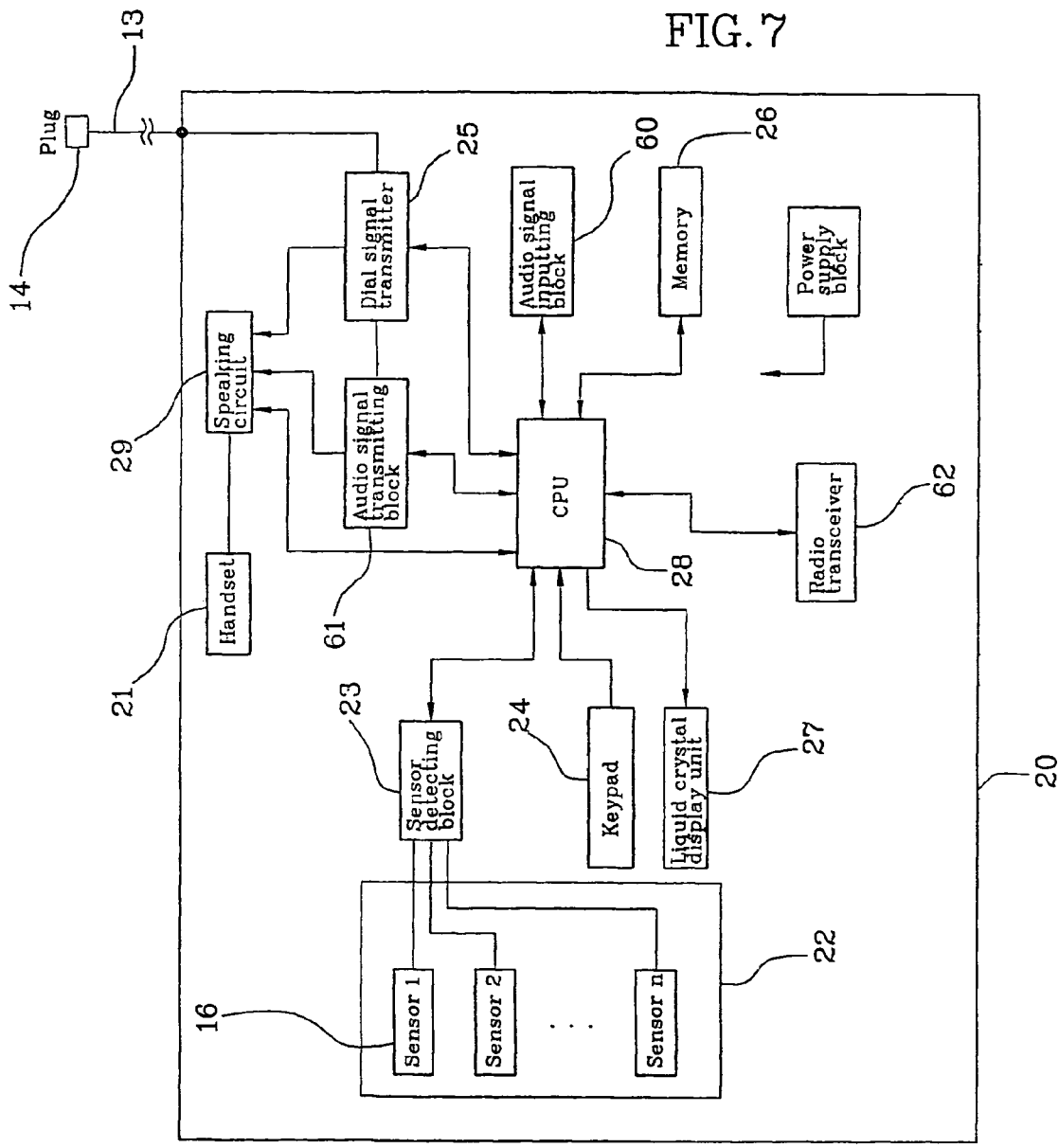
FIG. 7 is a block diagram illustrating the internal structure of the shortened dialing phone combined with a frame according to the second preferred embodiment of the present invention.

FIG. 7 is a block diagram illustrating the internal structure of the shortened dialing phone combined with a frame 20 according to the second preferred embodiment of the present invention.

Referring to FIG. 7, the shortened dialing phone combined with a frame 20 comprises: a sensor block 22 including a plurality of sensors 16 attached to specific positions in the picture 11 of the frame 18 and adapted to function as shortened dialing buttons; a sensor detecting block 23 for detecting signals inputted from the sensor block 22 and converting the detected signals into digital signals; a keypad 24 used for inputting shortened telephone numbers assigned to the shortened dialing buttons corresponding to the respective sensors 16 and inputting data for setting functions; a dial signal transmitter 25 for generating dial signals corresponding to the shortened telephone numbers and outputting the generated dial signals; a memory 26 for storing data corresponding to the shortened telephone numbers and performing a data operation; a liquid crystal display unit 27 for displaying both the shortened telephone numbers inputted through the keypad 24 and the data stored in the memory 26; and a CPU for controlling the elements constituting the phone; and a speaking circuit 29 connected to a wired/wireless handset 21 of the phone 20 and adapted to transmit dial signals of the dial signal transmitter 25 via the telephone line 13 under the control of the CPU.

The shortened dialing phone combined with a frame 20 may further include: an audio signal inputting block for receiving audio signals corresponding to the shortened telephone numbers, converting the received audio signals into digital audio data, and outputting the digital audio data to the CPU 28; and an audio signal transmitting block 61 connected to the CPU 28 and adapted to convert the audio data into analogue signals and output the analogue signals to the speaking circuit 29. That is to say, the speaking circuit 28 can transmit the audio data of the audio signal transmitting block 61 via the telephone line 13 under the control of the CPU 28.

The sensors 16 are preferably pressure sensors for sensing pressure, IR sensors for sensing heat, or various touch switches.

The frame and the sensor block can be preferably separated from other elements of the shortened dialing phone combined with a frame 20.

In addition, the shortened dialing phone combined with a frame 20 may further include a radio transceiver 62 for wirelessly receiving/transmitting telephone number data corresponding to the shortened telephone numbers or the audio data through RF or IR communication from the other shortened dialing phones combined with a frame under the control of the CPU 28.

Figure 8:
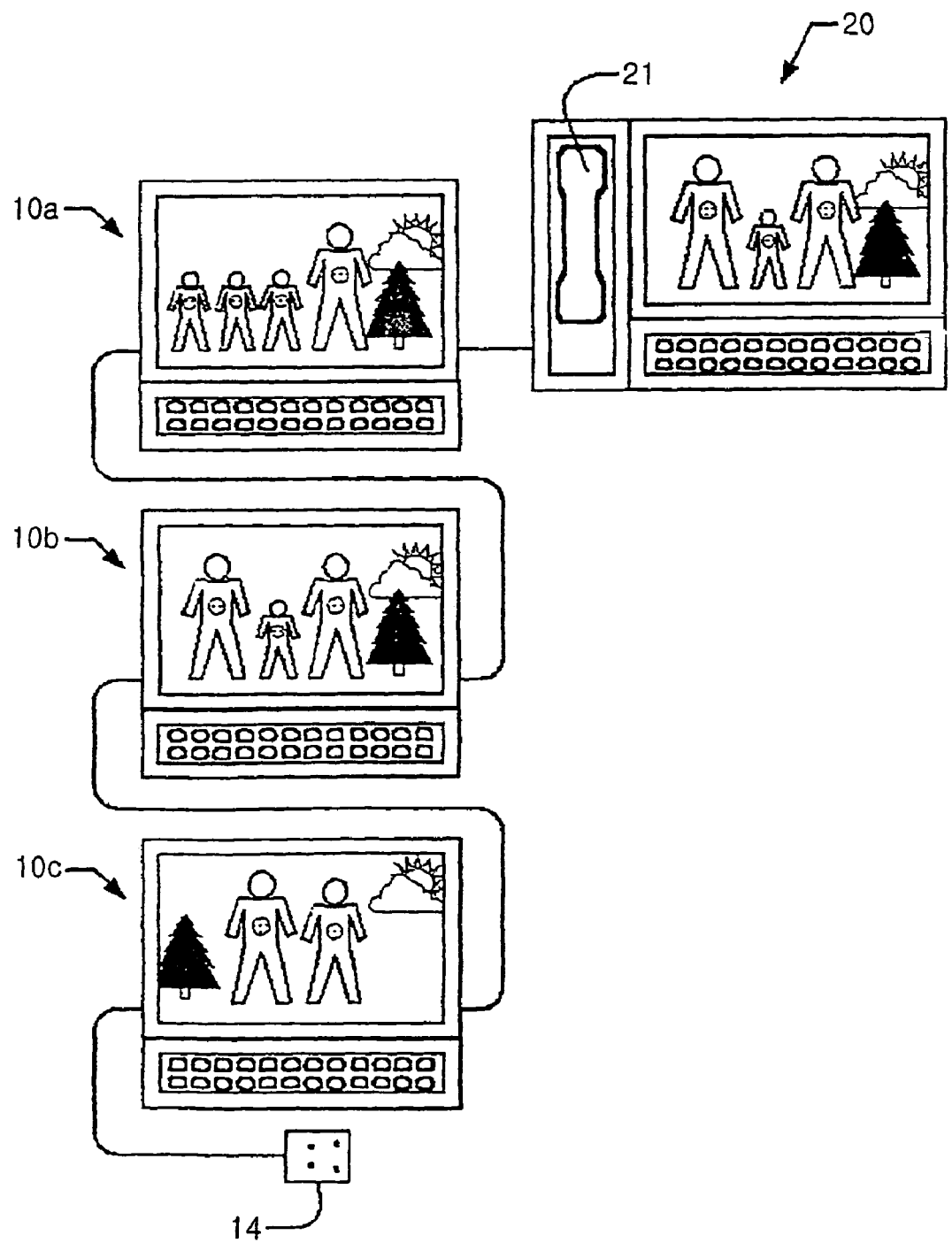
FIG. 8 is a diagrammatic view illustrating a state in which a plurality of shortened dialing phones combined with a frame are connected in a wired manner according to the second preferred embodiment of the present invention.
Figure 9:
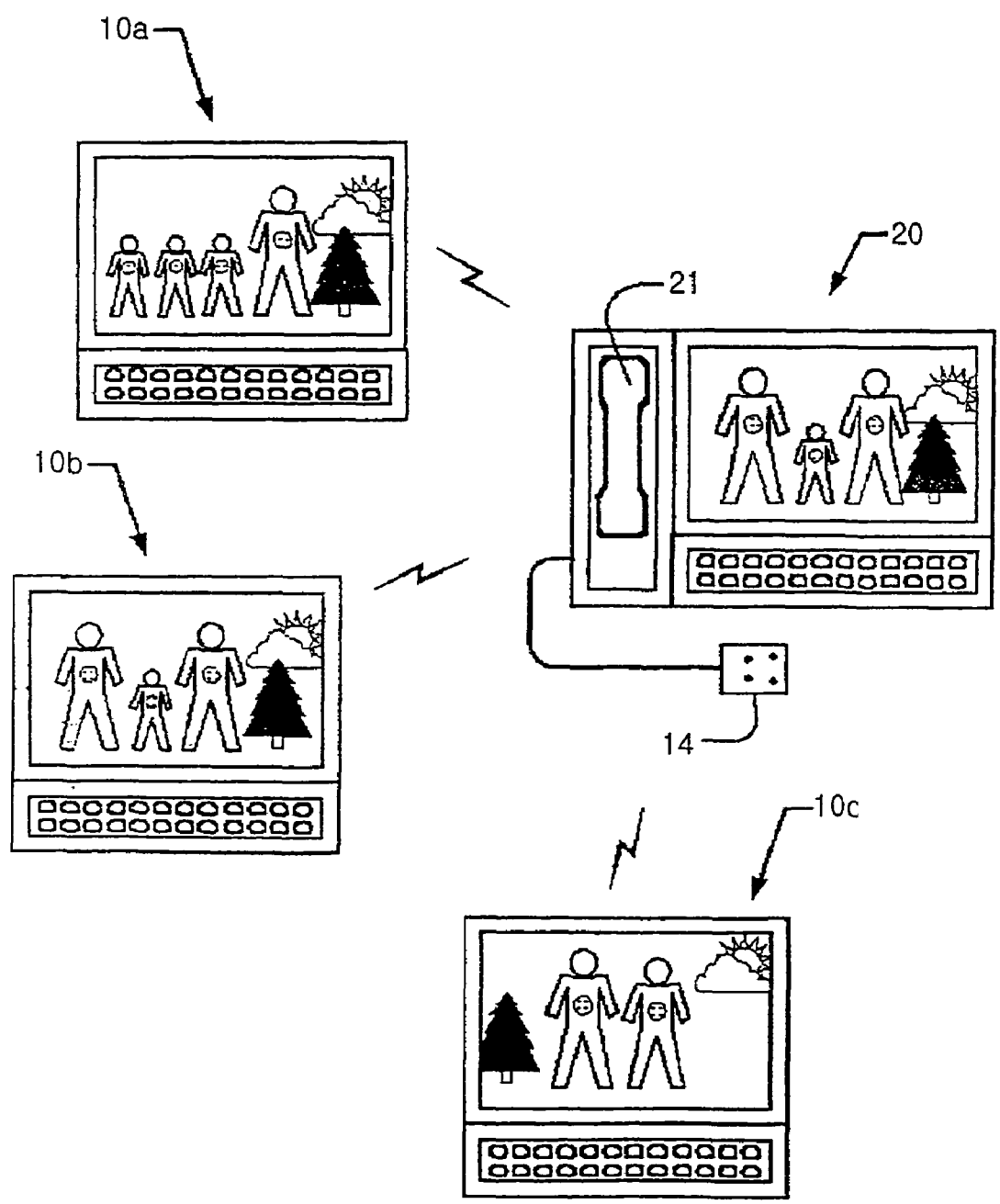
FIG. 9 is a diagrammatic view illustrating a state in which the shortened dialing phones combined with a frame are connected in a wireless manner according to the second preferred embodiment of the present invention.

That is, the shortened dialing phone combined with a frame 20 can be connected to other shortened dialing phones combined with a frame 20a to 20c and shortened dialing device in a wired manner, as shown in FIG. 8, and can be connected to them in a wireless manner through the radio transceiver 62 as well, as shown in FIG. 9. It goes without saying that the shortened dialing phone combined with a frame 20 can be operative to the plurality of shortened dialing devices combined with a frame of FIGS. 3 and 4a in a wired or wireless manner. The sensors 16 are pressure sensors for sensing pressure, IR sensors 16 for sensing heat, or various switches, e.g., press-type touch switches that can recognize contact like general telephone buttons. The sensors 16, which are attached to the specific positions in the picture 11 of the frame 18a and 18b, are separable from and connectable with other elements of the shortened dialing phone combined with a frame 20.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

As described above, the shortened dialing device and phone combined with a frame according to present invention have an advantage of making a phone call in such a manner that the sensors for shortened dialing are attached to the specific positions in the picture of the frame such that when a calling party applies pressure to or touches his or her finger to one of the specific positions, a calling signal corresponding to a predefined telephone number is sent out through a shortened dialing device or phone connected to the sensors.

The present invention has another advantage in that those who cannot read letters or figures can easily make a phone call by using easily memorable pictures, such as family pictures. For example, children can easily understand where to call and place a telephone call by inserting a picture which they draw by themselves into the picture frame.

The present invention has a further advantage of reducing the risk of breaking the picture frame since the protection plate 15 secured to the front surface of the picture 15 is made of resin materials which are thin, soft, transparent, and non-fragile, not made of glass.

The handset 51 or 21 can be used in a wired or wireless manner. Accordingly, if a wireless handset is used, a user can easily make a phone call by using the shortened dialing devices combined with a frame installed here and there in the room while hooking off the handset.

Besides, the present invention has an advantage in that since pre-stored audio signals as well as telephone numbers can be transmitted, those who cannot speak well, such as children or the old, can express their intentions in a simple fashion.

The invention claimed is:

1. A dialing device comprising:
   a sensor block including a plurality of sensors attached to specific positions in a picture of a frame and adapted to function as shortened dialing buttons;
   a sensor detecting block for detecting signals inputted from the sensor block and converting detected signals into digital signals;

a keypad for inputting shortened telephone numbers corresponding to the respective sensors of the sensor block and inputting data for setting functions;

a dial signal transmitter for generating dial signals corresponding to the shortened telephone numbers and transmitting the generated dial signals through a telephone and a telephone line;

a memory for storing data corresponding to the shortened telephone numbers and processing data operations;

a liquid crystal display unit for displaying both the shortened telephone numbers inputted through the keypad and the data stored in the memory;

a CPU for controlling the dialing device an audio signal inputting block for receiving audio signals corresponding to the shortened telephone numbers and converting the received audio signals into digital audio data; and an audio signal transmitting block connected to the CPU and adapted to convert the audio data into analog signals and transmit the analog signals through the telephone and the telephone line.

2. The dialing device of claim 1, further comprising a radio transceiver for wirelessly receiving/transmitting telephone number data corresponding to the shortened telephone numbers or the audio data through RF or IR communication from/to other dialing devices under the control of the CPU.

3. The dialing device of claim 1, wherein the dialing device is wirelessly operative to a signal transmitter to transmit the shortened telephone numbers, the signal transmitter comprising:

a radio transceiver for wirelessly receiving/transmitting telephone data corresponding to the shortened telephone numbers or audio data through RF or IR communication;

a dial signal transmitter for generating dial signals corresponding to the telephone number data received through the radio transceiver and transmitting the generated dial signals through the telephone and the telephone line;

an audio signal transmitting block for converting the audio data received through the radio transceiver into analog signals and transmitting the analog signals through the telephone and the telephone line;

a CPU for analyzing data received through the radio transceiver and outputting the analyzed data to the dial signal transmitter or the audio signal transmitting block; and a memory for operating and storing data with the CPU.

4. The dialing device of claim 3, wherein the signal transmitter further includes a liquid crystal display unit for displaying the telephone numbers while data corresponding to the shortened telephone numbers are transmitted through the CPU.

5. The dialing device of claim 3, wherein the signal transmitter is wirelessly operative to other dialing devices through the radio transceiver.

6. The dialing device of claim 2, wherein the radio transceiver is connected to the CPU such that when not used, it does not receive power through a power supply block which supplies a circuit with power.

7. The dialing device of claim 1, wherein the shortened dialing device is operative to other dialing devices in a wired or wireless manner.

8. The dialing device of claim 1, wherein the sensors are selected from the group consisting of pressure sensors for sensing pressure, IR sensors for sensing heat, and various touch switches.

9. The dialing device of claim 1, wherein the frame and the sensor block are separable from other elements of the dialing device.

10. A dialing phone having a frame comprising:

a sensor block including a plurality of sensors attached to specific positions in a picture of a frame and adapted to function as shortened dialing buttons;

a sensor detecting block for detecting signals inputted from the sensor block and converting the detected signals into digital signals;

a keypad used for inputting shortened telephone numbers corresponding to the respective sensors of the sensor block and inputting data for setting functions;

a dial signal transmitter for generating dial signals corresponding to the shortened telephone numbers and outputting the generated dial signals;

a memory for storing data corresponding to the shortened telephone numbers and processing a data operation;

a liquid crystal display unit for displaying the shortened telephone numbers inputted through the keypad and the data stored in the memory a CPU for controlling the phone;

an audio signal inputting block for receiving audio signals corresponding to the shortened telephone numbers, converting the received audio signals into digital audio data, and transmitting the digital audio data to the CPU; and an audio signal transmitting block operative to the CPU and adapted to convert the audio data into analog signals and output the analog signals a speaking circuit operative to a wired/wireless handset and adapted to transmit dial signals of the dial signal transmitter under the control of the CPU.

11. The dialing phone and a frame of claim 10, wherein the speaking circuit transmits audio data of the audio signal transmitting block via a telephone line under the control of the CPU.

12. The dialing phone of claim 10, further comprising a radio transceiver for wirelessly receiving/transmitting telephone number data or the audio data corresponding to the shortened telephone numbers through RF or IR communication from/to other shortened dialing phones combined with a frame under the control of the CPU.

13. The dialing phone and a frame of claim 10, wherein the phone is operative to other dialing phones in a wired or wireless manner.

14. The dialing phone and a frame of claim 10, wherein the sensors are selected from the group consisting of pressure sensor for sensing pressure, IR sensors for sensing heat, and various touch switches.

15. The dialing phone and a frame of claim 10, wherein the frame and the sensor block are separable from other elements of the shortened dialing phone combined with a picture frame.

* * * * *